US005609322A

United States Patent [19]

Bond

[11] Patent Number: 5,609,322

[45] Date of Patent: Mar. 11, 1997

[54] UTILITY JACK FOR ROOFING WORK

[76] Inventor: William R. Bond, 4710 Asdee La., Woodbridge, Va. 22192

[21] Appl. No.: 563,240

[22] Filed: Nov. 28, 1995

[51] Int. Cl.[6] ............................ F16M 13/00; B25H 1/18; B05C 21/00

[52] U.S. Cl. ........................ 248/558; 144/285; 144/286.5; 206/373; 220/570; 248/634; 248/148; 248/237

[58] Field of Search .................................... 248/237, 148, 248/132, 632, 33, 128, 129, 130, 558, 634; 108/25, 26, 32, 14; 182/45, 230; 144/285, 286.1, 286.5; 206/373, 1.8; 220/570

[56] References Cited

U.S. PATENT DOCUMENTS

| | | | |
|---|---|---|---|
| 612,256 | 10/1898 | Mattson | 248/237 X |
| 828,441 | 8/1906 | Thomas | 248/128 |
| 1,599,209 | 9/1926 | Cashman | 248/237 |
| 3,866,715 | 2/1975 | Foulk | 182/45 |
| 4,230,202 | 10/1980 | Kudra | 182/45 |
| 4,987,720 | 1/1991 | Wozney, Jr. | 248/237 X |
| 5,002,293 | 3/1991 | Gottselig | 248/132 |
| 5,119,904 | 6/1992 | Dierolf | 182/45 X |
| 5,190,303 | 3/1993 | Schumacher et al. | 108/25 |
| 5,232,187 | 8/1993 | O'Farrell et al. | 248/237 X |
| 5,249,397 | 10/1993 | Monaco | 182/45 X |

*Primary Examiner*—Leslie A. Braun
*Assistant Examiner*—Donald J. Wallace
*Attorney, Agent, or Firm*—Palmer C. DeMeo

[57] ABSTRACT

This invention pertains to a portable utility jack for use on an inclined roof or a flat roof. The utility jack is constructed from a mainframe which has at least one support frame which is adjustable to several positions to accommodate, for example, various roof pitches and which provides, in conjunction with a platform tray, for the level support of various construction or paint tools, materials and supplies and/or for the fixed level support of a paint tray. The utility jack is also capable of storing and transporting the various construction or paint tools, materials and supplies. The utility jack is constructed to be collapsable and portable. In one application thereof, the utility jack has a large area, non-skid, elastomeric element on one side thereof for enhanced traction and added safety for use on an inclined roof. In another application, the utility jack has four caster wheels attached thereto for use on a flat roof.

68 Claims, 7 Drawing Sheets

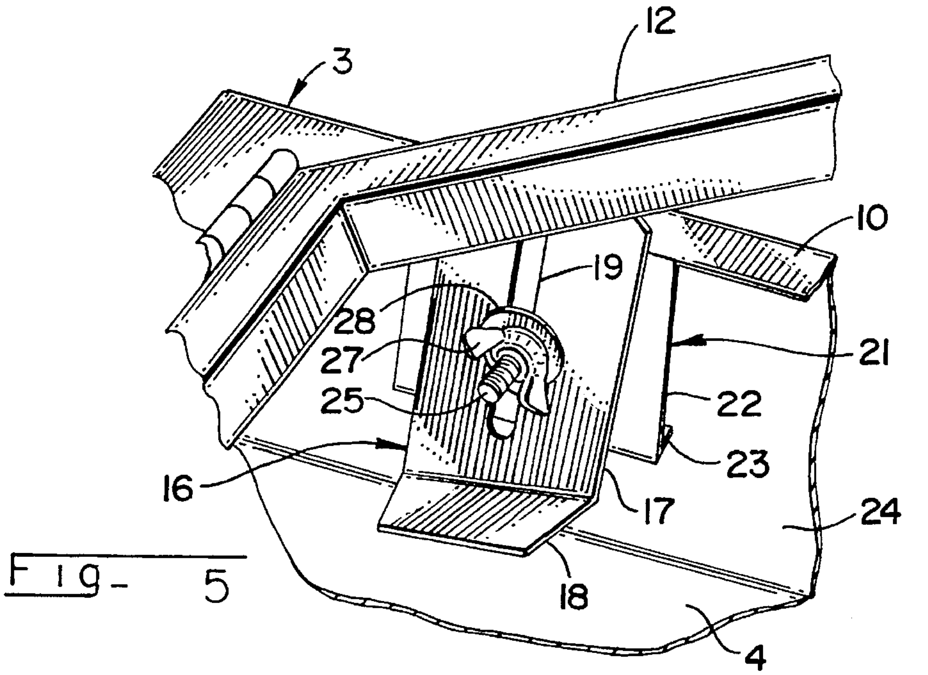
Fig- 5
Fig- 6
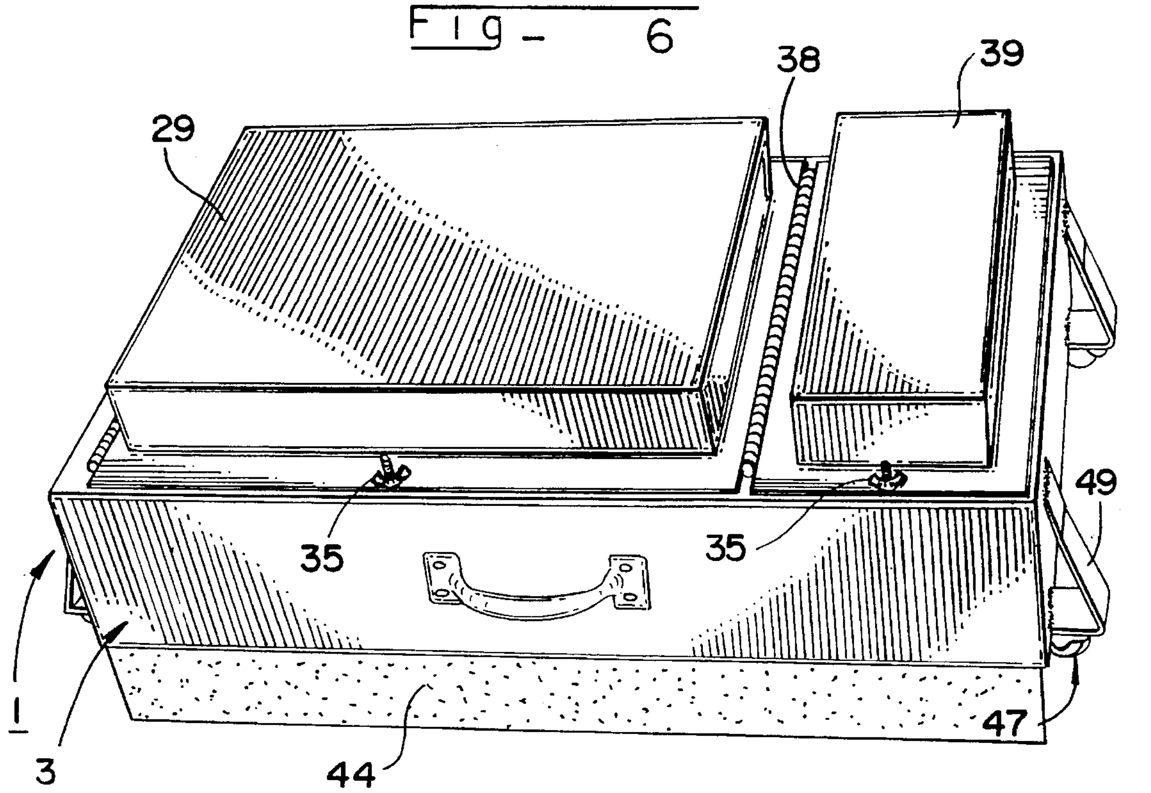

Fig- 11
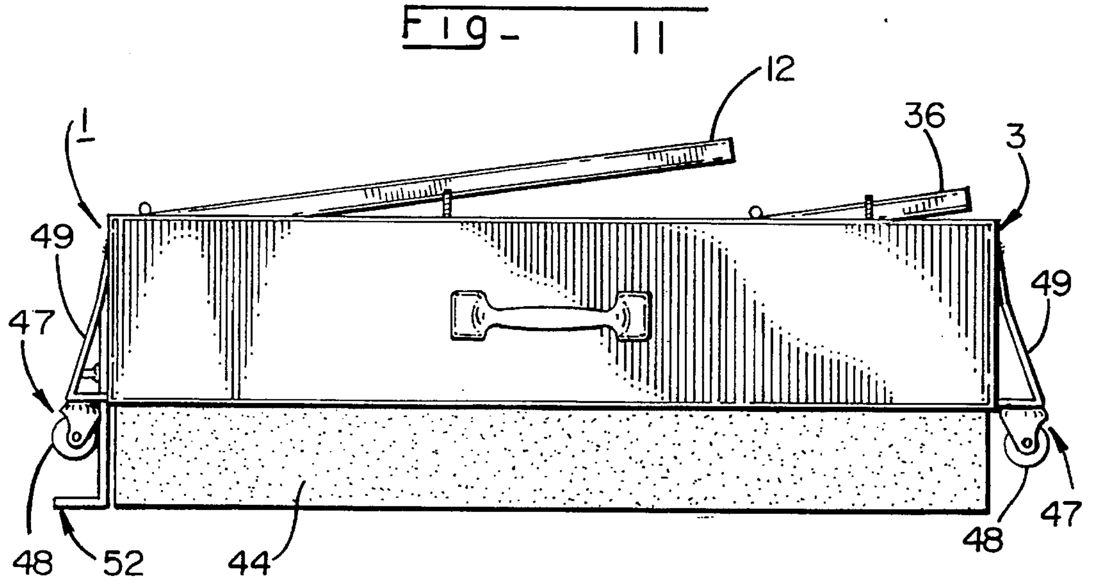
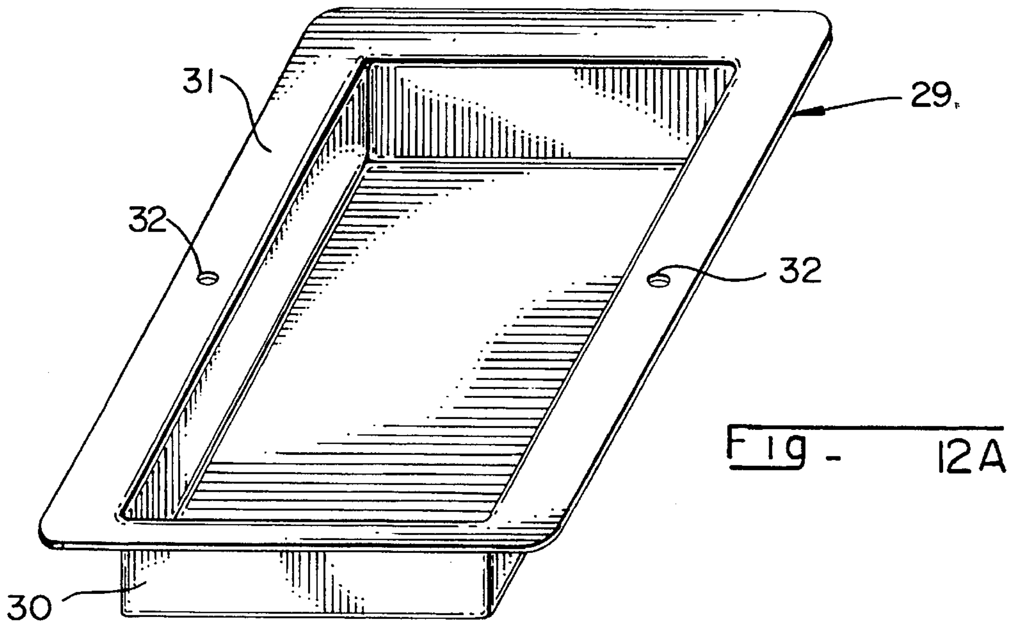
Fig- 12A

UTILITY JACK FOR ROOFING WORK

BACKGROUND OF THE INVENTION

1. Field of the Invention

The invention is related to a utility jack that may be used by construction workers, roofers, or painters on either an inclined roof or a flat roof. The utility jack, in one mode, has at least one adjustable support frame for providing a platform for the level support of a tray which can support various construction or paint tools, materials, and supplies and/or used as a paint tray. The utility jack, in another mode, also has at least one compartment for the storage of tools, materials or supplies for the construction worker, roofer or painter.

2. Description of the Related Art

Heretofore, utility jacks for the level support of construction tools, construction materials, or paint cans on an inclined roof have been known and used by construction workers, roofers, or painters but these utility jacks did not have a fixed level support for a paint tray and/or a large area, non-skid, elastomeric element for enhanced traction and added safety.

Some prior art examples of utility jacks for an inclined roof are disclosed in the following U.S. Pat. Nos. 612, 256; 1,599,209; and 5,249,397.

The Monaco patent (U.S. Pat. No. 5,249,397) discloses a platform for use on an inclined roof which platform has two adjustable support legs, each leg having a small area foot-like element with a rubber pad attached thereto.

The patents to Mattson (U.S. Pat. No. 612,256) and Cashman (U.S. Pat. No. 1,599,209), each discloses the use of utility jacks with an adjustable platform. The Mattson patent discloses the use of tangs or projections in the support legs of the jacks in order to secure the jack to the roof whereas the Cashman patent discloses the use of nails or screws to secure the jack to the roof.

The O'Farrel patent (U.S. Pat. No. 5,232,187) discloses a level support for a can of paint on an inclined roof. The support is constructed from a unitary, non-adjustable element with a cavity therein for receipt of the can of paint.

The patents to Dierolf (U.S. Pat. No. 5,119,904) and Kudra, III (U.S. Pat. No. 4,230,202), each discloses a support having a large area, non-skid element(s) used by construction workers on an inclined roof, but each support is used to support the construction worker, herself or himself.

The Wozney, Jr., patent (U.S. Pat. No. 4,987,720) discloses a non-skid holder for shingles on an inclined roof wherein said holder is provided with a large area, non-skid element.

SUMMARY OF THE INVENTION

There have been various types of supports used by construction workers, roofers, and painters who work on inclined roofs of different pitches. The utility jack of this invention provides for a facile placement of a jack, having at least one adjustable support frame with a reversible tray (used as a platform) onto an inclined roof as well as insuring the non-slippage of the utility jack on the roof without the burdensome use of nails or screws. This is accomplished by providing a portable utility jack having a large area, non-skid, elastomeric element associated therewith. The utility jack of this invention also provides for at least one adjustable support frame with a reversible tray (used as a paint tray) positioned therein so that a painter can pour paint into the tray and use either a brush or a roller. In either situation, the at least one adjustable support frame can be adjusted to compensate for the pitch of a roof and thus provide a level support for the reversible tray.

The utility jack has at least one adjustable support frame with a reversible tray which, in one position, can be fitted into the adjustable support frame and used as a paint tray and, in an opposite or reverse position, can be fixed to the mainframe of the jack to provide a storage compartment for tools, materials, or supplies.

In one embodiment of this invention, the utility jack has one adjustable support frame in which is positioned a reversible tray; the support frame and reversible tray are positioned over a hollow part of the mainframe of the jack and another reversible tray which is positioned over another hollow part of the mainframe. Both hollow pans of the jack may provide storage receptacles for tools, materials, or supplies when the reversible trays are in the proper position.

In another embodiment of this invention, the utility jack has two adjustable support frames, one larger than the other, with a reversible tray being associated with each. Each adjustable support frame is positioned over respective hollow parts of the mainframe of the jack. One particular application of the utility jack is to provide a different color paint in each tray when more than one color paint is needed for a particular job. There are a number of other possible uses for the two trays, for example, one of the trays may be used as a paint tray and the other tray may be used to hold construction tools, materials, or supplies. As in the first embodiment, both hollow parts of the mainframe of the jack may provide storage receptacles for tools, materials, or supplies when the reversible trays are in the proper position.

In a further application of this invention, the utility jack may be used on a flat roof by removing the large area, non-skid, elastomeric element therefrom and allowing four caster wheels, attached near the comers of the jack, to contact the roof. The utility jack in this application can be used to support tools, materials or supplies or to support at least one paint tray.

It is an object of this invention to provide a portable, utility jack that has several functions and can be used by construction workers, roofers, or painters on an inclined roof or on a flat roof.

It is another object of this invention to provide a utility jack that has a large area, non-skid, elastomeric element associated therewith for enhanced traction and added safety on an inclined roof.

It is yet another object of this invention to provide a utility jack that has at least one adjustable support frame for providing for the level support of tools, materials or supplies or for providing for the level support of a paint tray when the jack is used on an inclined roof.

It is a further object of this invention to provide a utility jack for supporting tools, materials, and supplies and/or paint trays when the jack is used on a flat roof.

It is yet a further object of this invention to provide a utility jack that is strong, collapsable and portable.

Other objects, features, and advantages of this invention will become more apparent from the following detailed description of the invention as illustrated in the accompanying drawings in which like reference numerals refer to like parts throughout the different views. The drawings are schematic and not necessarily to scale, emphasis being placed instead upon illustrating principles of this invention.

BRIEF DESCRIPTION OF THE DRAWINGS

FIG. 5 is an enlarged perspective view of the circled area A shown in FIG. 4.

FIG. 6 is a perspective view of the utility jack of FIG. 2 shown in a closed position.

FIG. 11 is a side view of the utility jack of FIG. 2 with both adjustable support frames shown partially open.

FIG. 12A is a perspective view of the large reversible tray of the utility jack of this invention.

DESCRIPTION OF THE PREFERRED EMBODIMENTS

Figure 1:
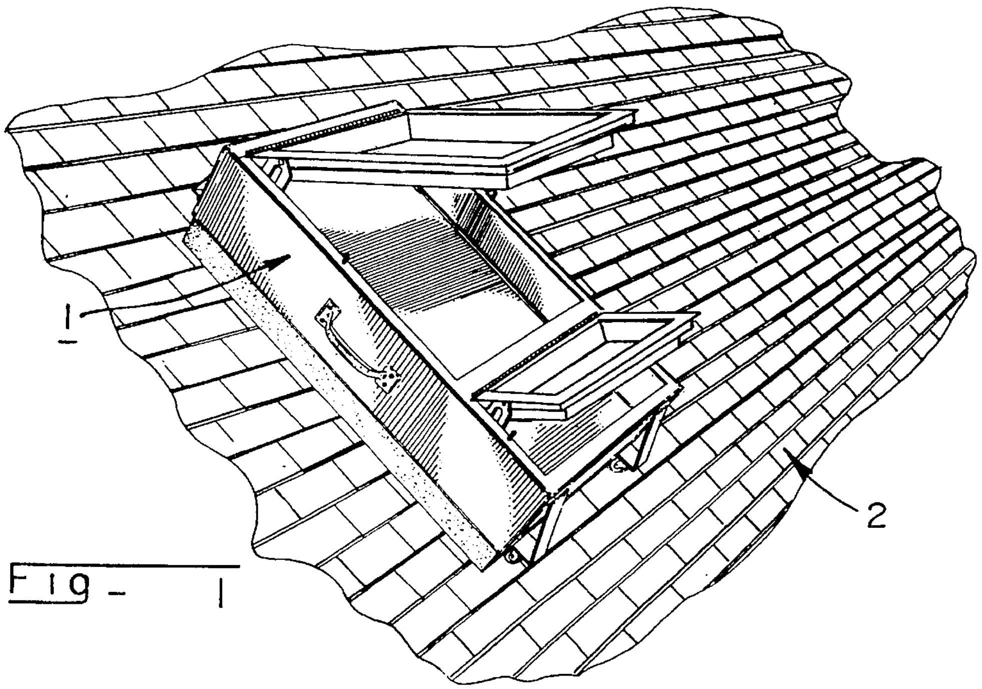
FIG. 1 is a perspective view of one embodiment of the utility jack of this invention on an inclined roof.

Referring to FIG. 1, there is shown one application of the utility jack 1 of this invention on an inclined roof 2. The utility jack 1, in a closed position, is transported onto the inclined roof 2 by a construction worker, roofer or painter. The construction worker, roofer or painter then sets the utility jack 1 on the inclined roof with the elastomeric element 44 contacting the roof 2 and then adjusts, as needed, one or both of the adjustable support flames 12,36 to compensate for the pitch of the roof and thus provide a level support for one or both reversible trays 29,39.

Figure 2:
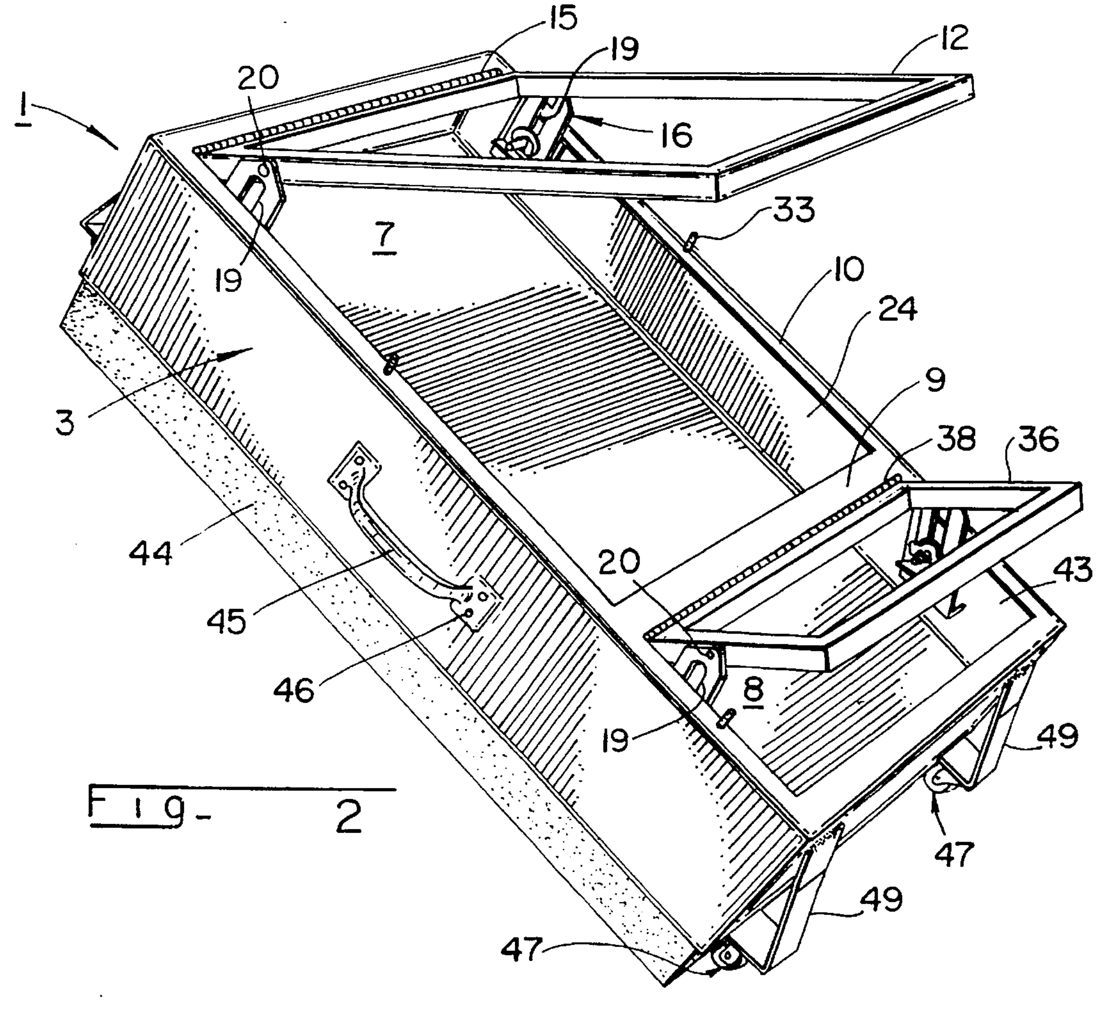
FIG. 2 is an enlarged perspective view of the utility jack shown in FIG. 1 with both trays removed.

Reference is now made to FIG. 2 wherein there is shown an enlargement of the utility jack 1 shown in FIG. 1. The utility jack 1 is constructed from a mainframe 3 which has upstanding walls and is generally rectangular in shape. The mainframe 3 has a lateral partition 4 therein which divides the inner volume of the mainframe into two cavities, an upper cavity and a lower cavity 5 (not seen in FIG. 2). A vertical partition 6 (not seen in FIG. 2) divides the upper cavity into two chambers, a first chamber 7 and a second chamber 8 with the first chamber 7 being larger than the second chamber 8. The vertical partition 6 has a flange 9 which extends inwardly of the second chamber 8. The mainframe 3 also has an inwardly extending flange 10 along the upper edges thereof and a ledge 11 (not seen in FIG. 2) just beneath the rear, inwardly extending flange. The mainframe 3 and its partitions 4,6 are constructed from sheet metal. The mainframe 3 is formed from four sections, each section having an upstanding wall with a flange bent therefrom. The four sections are welded together to form a rectangularly shaped mainframe 3 with the flanges 10 extending inwardly. The partitions 4,7 are subsequently welded to the upstanding walls to form the upper cavity and the lower cavity 5 and the first and second chambers 7,8. The ledge 11 itself is formed, for example, from a three-quarter inch, metallic square tubing which is welded to the mainframe 3 just beneath the rear, inwardly extending flange 10 thereof. The ledge 11 may also be formed by other means. A first adjustable support frame 12 is associated with the first chamber 7 and is attached to the ledge 11 in the first chamber 7 by means of a hinge 15 which is an elongated butt hinge or piano hinge. However, the first adjustable support frame 12 may be attached to the ledge 11 by several hinges or by other means which will cause the support frame 12 to move in the desired direction. The first adjustable support frame 12 is formed, for example, by welding together four sections of three-quarter inch, metallic tubing. The shape of the first adjustable support frame 12 is substantially rectangular and of a size to fit within the opening of the first chamber 7. The first adjustable support frame 12 has two movable brackets 16,16, each being attached to a respective long outer side of the support frame 12. Each movable bracket 16 has a flat, elongated portion 17 and a flat, short portion 18 which extends at an angle from one end of the elongated portion 17. Each movable bracket 16 has an elongated aperture 19 in the elongated portion 17 thereof, the purpose of which will be explained later. The short portion 18 of each bracket 16 extends inwardly of the first chamber 7. Each movable bracket 16 is attached to a respective long, outer side of the support frame 12 by a rivet 20 in such a manner that each bracket 16 is rotatably movable with respect thereto. Rivet 20 (as well as other rivets) used in the construction of the utility jack of this invention may be of the commercial grade type pop-rivet. There is also a pair of L-shaped, fixed brackets 21,21, each having a long leg portion 22 and a short leg portion 23. Each fixed bracket 21 is attached to the mainframe 3 within the first chamber 7 such that it is adjacent a respective movable bracket 16 of the first support frame 12. Each fixed bracket 21 has its long leg portion 22 parallely spaced from a respective long sidewall 24,24 (only one of which is shown in FIG. 2) and has a threaded bolt 25 attached thereto such that a threaded portion 26 of the bolt 25 passes through the elongated aperture 19 in an adjacent elongated portion 17 of movable bracket 16 of the first adjustable support frame 12. The bolt 25 is attached to the long leg portion 22 of the bracket 21 by drilling a hole therein, passing the threaded portion 26 of the bolt 25 through the hole and welding the head of the bolt to the the long leg portion 22 of the bracket 21. Each fixed bracket 21 has its long leg portion 22 attached (for example, by welding) to the inwardly extending flange 10 of the mainframe 3 and has its short leg portion 23 attached (for example, by welding) to a respective long sidewall 24 of the mainframe 3. When the utility jack 1 is placed on an inclined roof having a specific pitch, the construction worker, roofer or painter raises the support frame 12 through a given angle corresponding to the pitch of the roof so as to provide a level support and then secures the position of the support frame 12 by means of a wing-nut 27 which is screwed onto a respective threaded portion 26 of bolt 25 thus locking a movable bracket 16 of the support frame 12 to a respective fixed bracket 21, such as shown in FIG. 2. The elongated aperture 19 in the movable bracket 16 with the threaded portion 26 of the bolt 25 acting as a guide allows the support frame 12 to be raised at various angles and at the same time limits the amount that the support frame 12 can be raised. However, the length of the aperture 19 in the movable bracket 16 is sufficient to allow the support frame 12 to be raised and provide a level platform for most conventional, inclined roofs. A washer 28 may also be inserted between the movable bracket 16 and the wing-nut 27. A first reversible tray 29, associated with the first support frame 12, is placed by the construction worker, roofer or painter within the first support frame 12 as shown in FIG. 1. The first reversible tray 29 (see FIG. 12A) has a dished portion 30 and an outwardly extending flange 31 surrounding the upper edge of the dished portion 30. The outer dimensions of the dished portion 30 of the first reversible tray 29 are such as to fit within the first adjustable support frame 12. The first reversible tray 29 has an aperture 32 along each of the opposing sides of the outwardly extending flange 31. The mainframe 3 also has threaded bolts 33,33 secured to the inwardly extending flange 10 along opposite sides of the mainframe 3 and adjacent the first chamber 7. Each threaded bolt 33 is secured to the flange 10, for example, by drilling a hole therein, passing the threaded portion 34 of the bolt 33 through the hole and welding the head of the bolt 33 to the flange 10. When the first support frame 12 is in a closed position, the first reversible tray 29 can be positioned over the first support frame 12 and the first chamber 7 such that the apertures 32,32 in its flange 31 are fitted over the corresponding threaded portions 34,34 of bolts 33,33 and secured to the mainframe 3 by wing-nuts 35,35 (not seen in FIG. 2). The first reversible tray 29 can be positioned in two orientations relative to the first support frame 12 or to the mainframe 3. The first orientation of the tray 29 is with its dished portion 30 extending inwardly of the first support frame 12 (regardless of whether the first support frame 12 is in open or closed position) and the second orientation of the tray 29 is with its dished portion 30 extending outwardly of the mainframe 3 (when the first support frame 12 is in a closed position).

Still referring to FIG. 2, a second adjustable support frame 36, smaller in size than that of the first adjustable support frame 12, is associated with the second chamber 8 and is attached to the ledge 37 (not seen in FIG. 2) beneath the flange 9 of the verticle partition 6 in the second chamber 8 by means of a hinge 38 which is an elongated butt hinge or piano hinge. However, the second adjustable support frame 36 may be attached to the ledge 37 by several hinges or by other means which will cause the support frame 36 to move in the desired direction. The second adjustable support frame 36 is also constructed from three-quarter inch, square metallic tubing in a manner similar to that of the first adjustable support frame 12. The arrangement of the second adjustable support frame 36 within the second chamber 8 is similar to that of the first adjustable support frame 12 within the first chamber 7. A second reversible tray 39 (see FIG. 12B) has a dished portion 40 and an outwardly extending flange 41 surrounding the upper edge of the dished portion 40. The second reversible tray 39 has an aperture 42 in each of the opposing short sides of the outwardly extending flange 41. The dished portion 40 of the second reversible tray 39 fits within the second adjustable support frame 36 in one of its orientations since the outer dimensions of the dished portion 40 of the second reversible tray 39 are slightly less than the inner dimensions of the second adjustable support frame 36. The second adjustable support frame 36 has a movable bracket 16 attached to each short, outer side of the support frame 36 by a rivet 20 in a manner similar to that for the first adjustable support frame 12. There is also a fixed, L-shaped bracket 21 attached to each of the shorter sidewalls 43,43 in the smaller or second chamber 8; each fixed L-shaped bracket 21 having a threaded bolt 25 welded thereto and being attached to a respective sidewall 43 in a manner similar to that for the fixed L-shaped bracket 21 in the larger or first chamber 7. The arrangement and operation of the second adjustable support frame 36 relative to the second chamber 8 is similar to that for the first adjustable support frame 12 relative to the first chamber 7. When the utility jack 1 is used on an inclined roof, the second adjustable support frame 36 may be raised and secured in a manner similar to that for the first adjustable support frame 12. The second reversible tray 39, associated with the second support frame 36, is placed by the construction worker, roofer or painter within the second support frame 36 as shown in FIG. 1.

The mainframe 3 also has threaded bolts 33,33 secured to the inwardly extending flange 9 along opposite sides of the mainframe 3 and adjacent the second chamber 8. When the second adjustable support frame 36 is in a closed position, the second reversible tray 39 can be positioned over the second support frame 36 and the second chamber 8 such that the apertures 42,42 in its flange 41, are fitted over the corresponding threaded bolts 33,33 and may be secured to the mainframe 3 by wing-nuts 35,35 (not shown in FIG. 2). The second reversible tray 39, just like the first reversible tray 29, can be positioned in two orientations relative to the second adjustable support frame 36 or to the mainframe 3. The first orientation of the tray 39 is with its dished portion 40 extending inwardly of the second support frame 36 (regardless of whether the second support frame 36 is in an open or closed position) and the second orientation of the tray 39 is with its dished portion 40 extending outwardly of the mainframe 3 (when the second support frame 36 is in a closed position). In the second orientation, the second support frame 36 is secured to the mainframe 3 by wing-nuts 35,35 (not shown in FIG. 2.). The mainframe 3, first and second adjustable support frames 12, 36 and first and second reversible trays 29,39 are constructed from galvanized sheet metal with a baked on enamel or powdered coating. Alternatively, the mainframe, adjustable support frames, and reversible trays may be constructed from durable plastic or other metallic material. The overall dimensions of the mainframe 3 are approximately 25.5 inches in length, 16 inches in width, and 5.25 inches in height; however, other overall dimensions dimensions can also be used depending, inter alia, on the particular application or use. The depth of the lower cavity 5 is approximately two inches.

As shown in FIGS. 1 and 2, there is an elastomeric element 44 which is pushed into the lower cavity 5 of the mainframe 3. The elastomeric element 44 is preferably made from foam rubber but other elastomeric materials may be used as well. The elastomeric element 44 is approximately four inches thick and has an area slightly larger than the area of the lower cavity 5 so as to have a snug fit therewithin. A handle 45 is also provided along one of the long outside walls of the mainframe 3 so that the utility jack may be easily carried when it is in its closed condition. The handle 45 is attached to a sidewall of the mainframe 3 by rivets 46 but screws may also be used as well; the handle 45 may also be welded to the sidewall of the mainframe 3. The utility jack 1 also has four caster wheel assemblies 47,47,47,47 (only two of which are clearly shown in FIGS. 1 and 2) attached, for example, by welding to the short leg of a respective one of four L-shaped brackets 49,49,49,49 which are, in turn, attached, for example, by welding to the outside endwalls of the mainframe 3, near the corners of the mainframe 3. The caster wheels 48 extend below the bottom of the mainframe 3 and the elastomeric element 44 extends below the caster wheels 48 about three-quarters of an inch. In some applications of the utility jack 1 of this invention, such as for use on a flat roof, the elastomeric element 44 is removed from the lower cavity 5 of the mainframe 3, thus allowing the caster wheels to come in contact with the flat roof and permitting the construction worker, roofer or painter to easily push the utility jack 1 to any desired location on the flat roof.

Figure 3:
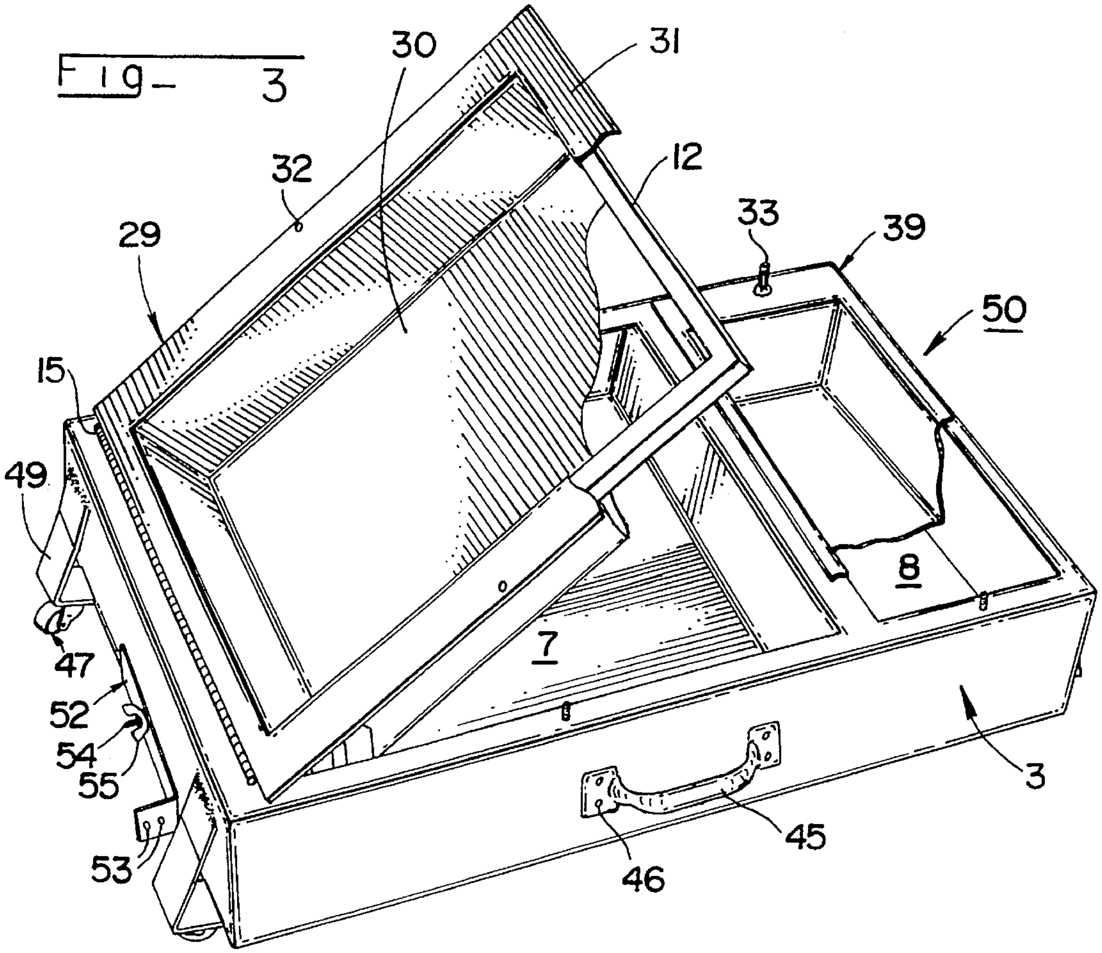
FIG. 3 is a perspective view of another embodiment of the utility jack of this invention with both trays shown partially cut away and with the elastomeric element removed.

Referring now to FIG. 3, there is shown a second embodiment of the utility jack of this invention with the elastomeric element 44 removed. The utility jack 50 of the second embodiment of this invention is similar in structure and dimensions to the utility jack 1 of the first embodiment except that there is no second or smaller adjustable support frame. The second reversible tray 39 may be positioned relative to the second chamber 8 in either one of two orientations, that is, with its dished portion 40 within the chamber 8 or with its dished portion 40 extending outwardly from the chamber 8. This embodiment of the utility jack 50 has the same applications as the first embodiment, that is, for use on an inclined roof or on a flat roof. However, the second embodiment of the utility jack 50 would be more adaptable for use on a flat roof when the elastomeric element 44 is removed.

Figure 4:
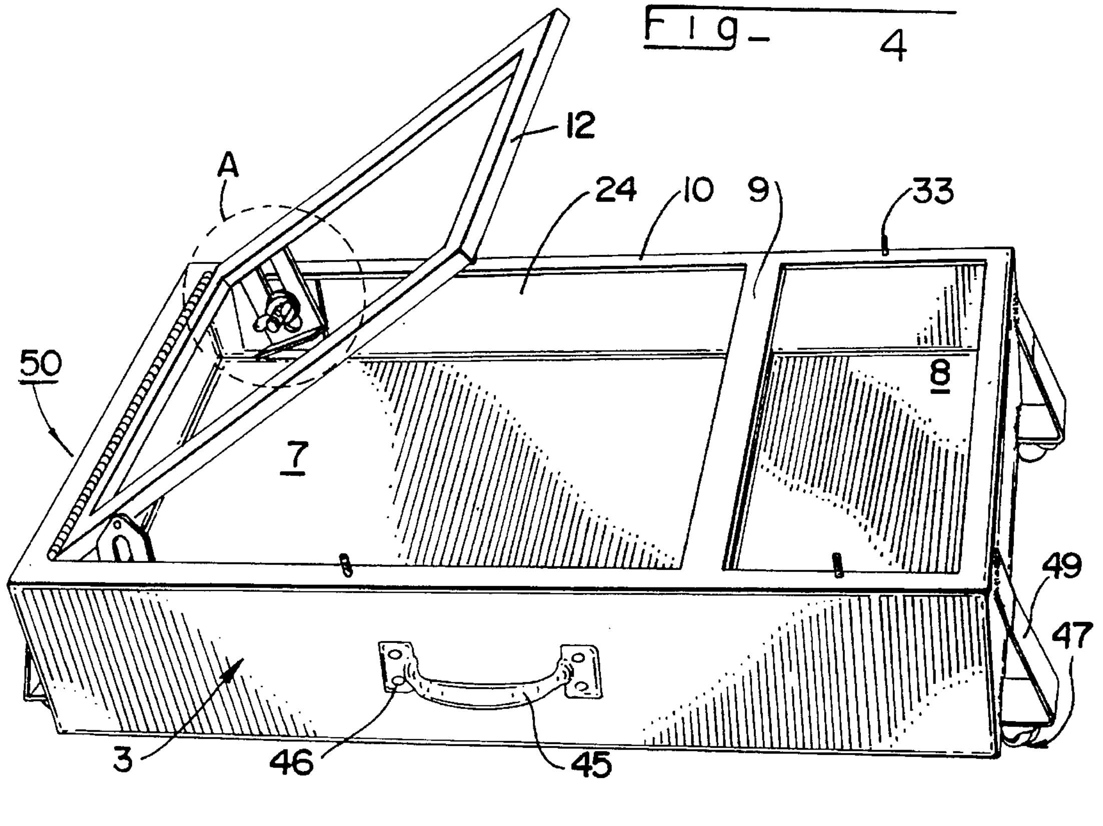
FIG. 4 is another perspective view of the utility jack shown in FIG. 3 with both trays removed.

In FIG. 4, there is shown another perspective view of the second embodiment of the utility jack 50 of this invention with the first and second reversible trays 29,39 and the elastomeric element 44 removed and with the adjustable support frame 12 in an open position.

Referring now to FIG. 5, there is shown an enlargement of the structure in the circled area A of FIG. 4 showing the details of the movable and fixed brackets 16 and 21, respectively. The movable bracket 16 has a flat, elongated portion 17 with an elongated aperture 19 therein and a flat, short portion 18 bent inwardly towards the center of the first chamber 7 of the mainframe 3. The movable bracket 16 is attached to an outer, long side of the adjustable support frame 12 by a rivet 20 (not seen in FIG. 5) in such a manner as to be rotatable with respect thereto. The L-shaped fixed bracket 21 has a long, leg portion 22 and a short, leg portion 23. A threaded bolt 25 is fixed to the long, leg portion 22 by drilling a hole therethrough, passing the threaded portion 26 of the bolt 25 through the hole and welding the head (not seen in FIG. 5) of the bolt 25 such that the threaded portion 26 of the bolt 25 is on the side of the long, leg portion 22 opposite to that of the short, leg portion 23. The top edge of the long, leg portion 22 is welded to the inwardly extending flange 10 of the mainframe 3 and the short, leg portion 23 is welded to the inner sidewall 24 of the mainframe 3. In this particular arrangement, the brackets (16,21), the adjustable support frame 12 and the mainframe 3 are metallic.

FIG. 6 shows the utility jack 1 of the first embodiment in a closed position with both reversible trays 29,39 flipped over and secured to the mainframe 3 by four wing-nuts 35,35,35,35 (only two of which can be seen in FIG. 6). In this closed position, tools, supplies and materials can be stored in each of the first and second chambers 7,8 and transported by a construction worker, roofer, or painter onto an inclined or flat roof.

Figure 7:
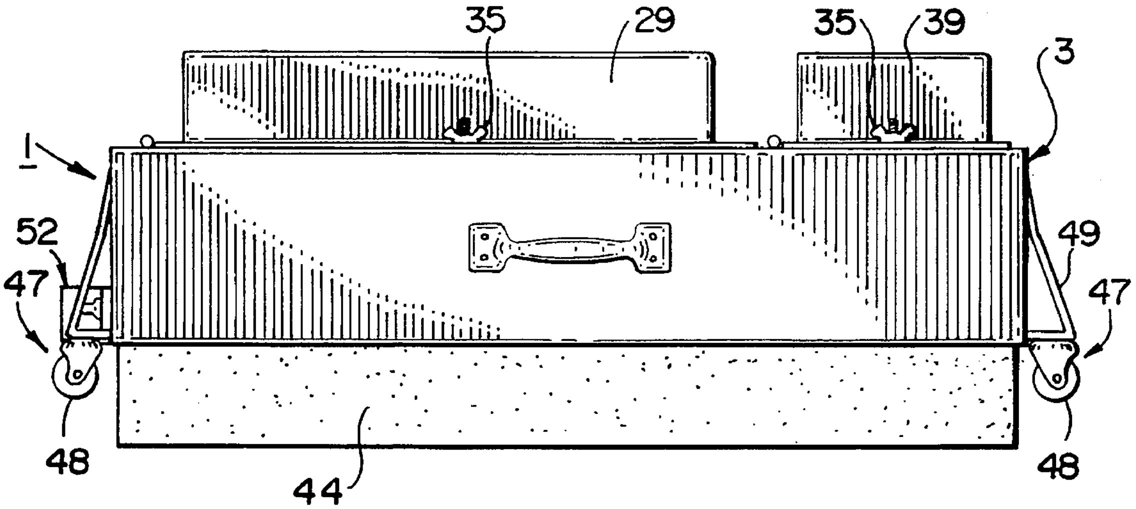
FIG. 7 is a side view of the utility jack shown in FIG. 6.

FIG. 7 shows a side view of the utility jack 1 of FIG. 6.

Figure 8:
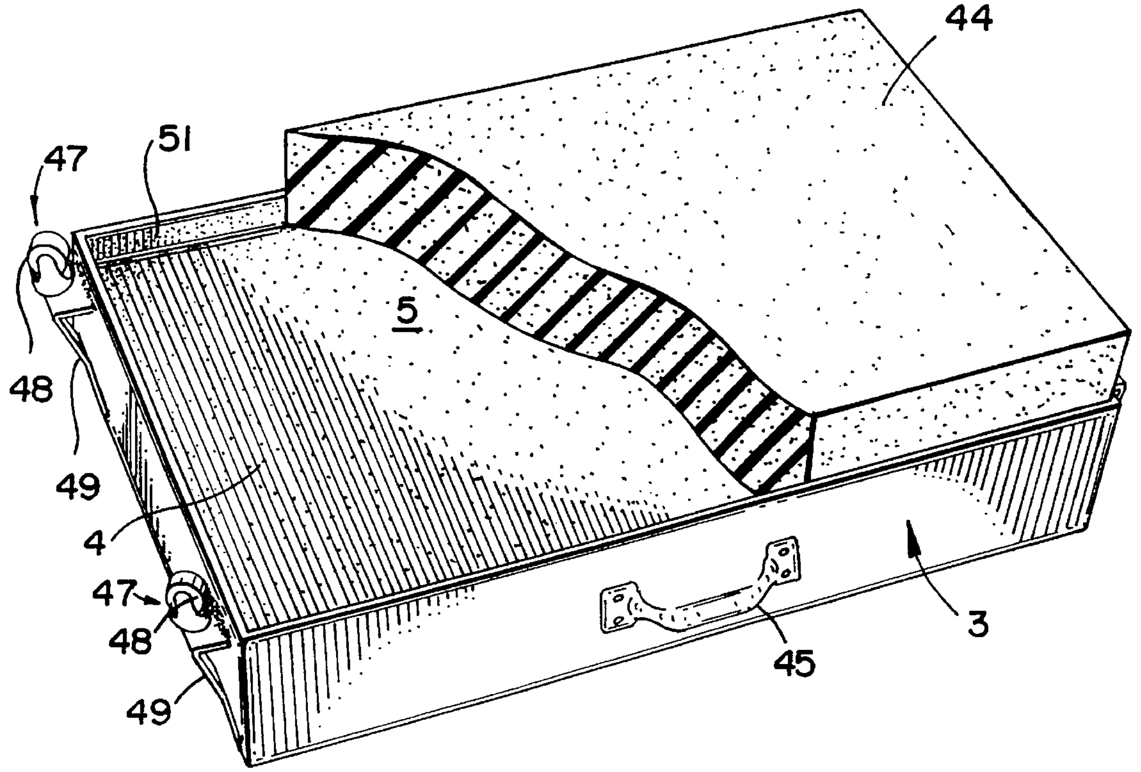
FIG. 8 is a perspective underside view of the utility jack of this invention with the foam rubber element shown partially cut away.

In FIG. 8, there is shown an underside view of the utility jack of this invention with the elastomeric element 44 partially cut away in order to show how the elastomeric element 44 (made, for example, from foam rubber) fits into the bottom or lower cavity 5 of the mainframe 3. In order to further insure the retention of the elastomeric element 44 within the lower cavity 5, a non-skid material 51 is provided on the surfaces of the inner sidewalls of the mainframe 3 in the lower cavity 5. For example, this non-skid material 51 may be an epoxy paint including a sand additive which is applied to the surfaces of the inner sidewalls.

Figure 9:
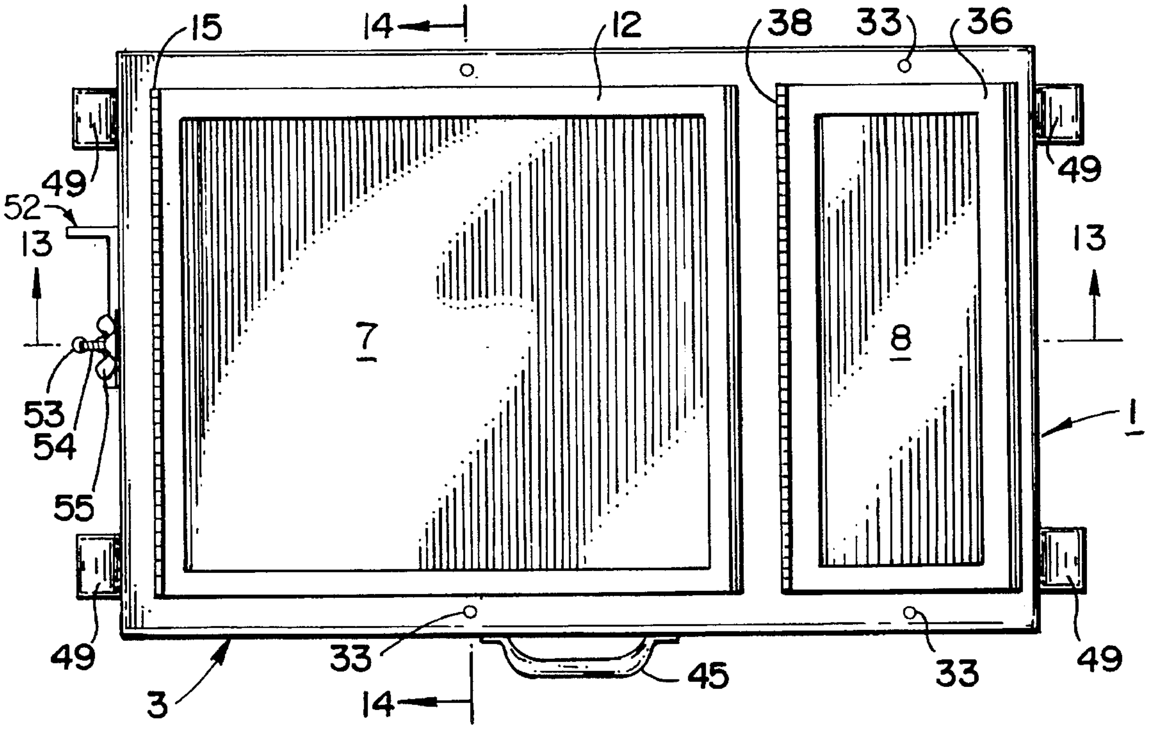
FIG. 9 is a top plan view of the utility jack, shown in FIG. 2, showing the safety hook in an operational position.

Referring now to FIG. 9, there is shown a top view of the utility jack 1 of this invention. The utility jack 1 is shown with both of its adjustable support frames 12 and 36 in open positions and with both reversible trays 29 and 39 removed. FIG. 9 also shows a safety hook 52 in an operational position.

Figure 10:
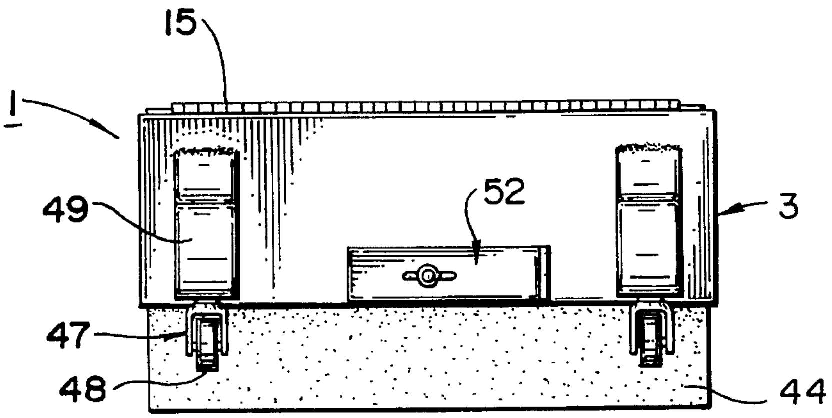
FIG. 10 is an end view of the utility jack, shown in FIG. 9, showing the safety hook in an inoperational position.

FIG. 10 shows an end view of the utility jack 1 of this invention with a safety hook 52 in a non-operatioal position. The safety hook 52 is L-shaped with the smaller leg thereof having at least one aperture 53 therein. The safety hook 52 is secured to an external endwall of the mainframe 3 by means, for example, of a threaded bolt 54 (fixed, for example, by welding it to the mainframe) and wing-nut 55 in such a manner that the safety hook 52 can be rotated in an operational or non-operational position. The safety hook 52 is used only in possibly dangerous situations on an inclined roof, for example, when the pitch of the roof is unusually high. When it is necessary to use the safety hook 52, a sturdy nail or screw is passed through the aperture 53 and into the inclined roof in order to fasten the utility jack 1 securely to the roof. The head of the nail or screw will preferably be larger than the diameter of the aperture 53 in the safety hook 52. The safety hook 52 is made from strong material, for example, metal, and can be made from the same material as the mainframe if the mainframe 3 is made from metal. The utility jack 50 of the second embodiment of this invention also has this feature of a safety hook.

Referring now to FIG. 11, there is shown another view of the utility jack of this invention with the safety hook 52 in an operational position.

Figure 12B:
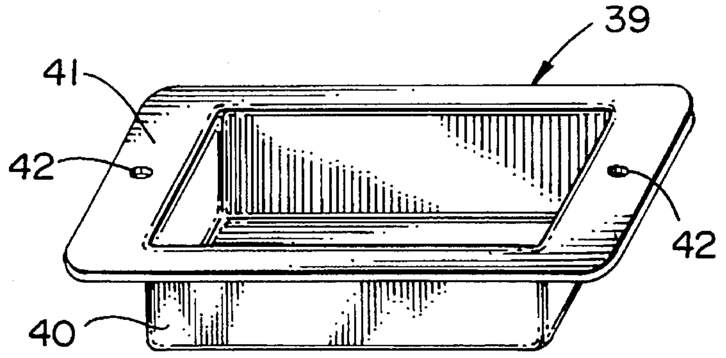
FIG. 12B is a perspective view of the small reversible tray of the utility jack of this invention.

FIGS. 12A and 12B show perspective views of the first and second reversible trays 29 and 39, respectively. The first reversible tray 29 has a dished portion 30, an outwardly extending flange 31, and an aperture 32 along each of the longer opposing sides of the flange 31; the aperture 32 is about mid-way along an opposing side. The second reversible tray 39 also has a dished portion 40, an outwardly extending flange 41, and an aperture 42 along each of the opposing shorter sides of the flange 41; the aperture 42 is about mid-way along an opposing side. The first and second reversible trays 29 and 39 are each made from sheet metal. For example, each tray may be made from two pieces of sheet metal, one piece for forming the dished portion of the tray and another piece for forming the outwardly extending flange of the tray. The dished portion of the tray is formed by cutting sections out of the four corners of a rectangular sheet of metal of appropriate size, then bending each of the resulting four sides in the same direction to form a box shaped structure, and finally, welding together the four sides of the box shaped structure at the four respective corners thereof. Another piece of sheet metal is then cut to form a rectangular frame of appropriate size such that the inner edge thereof matches the upper peripheral edge of the box shaped structure or dished portion. This rectangular frame forms the outwardly extending flange of the reversible tray. The rectangular frame is then welded to the box shaped structure, thus resulting in a reversible tray having a dished portion and an outwardly extending flange. A pair of apertures is then drilled in the appropriate pair of opposing sides of the outwardly extending flange of the reversible tray. Alternatively, each reversible tray 29 and 39 can be stamped out or molded from an appropriately sized sheet of metal.

Figure 13:
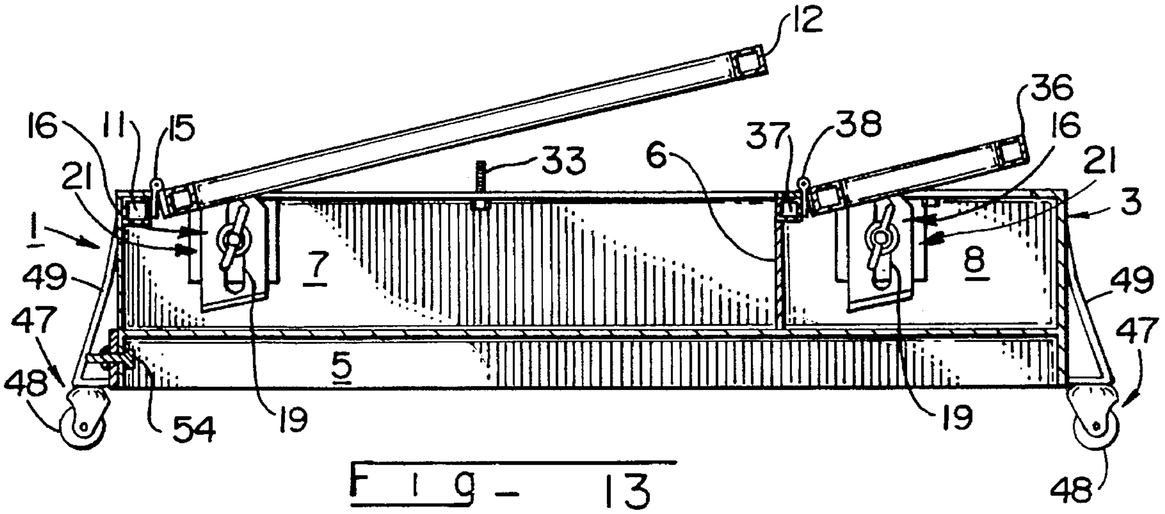
FIG. 13 is a cross-sectional view of the utility jack shown in FIG. 9 taken through lines 13,13 with both adjustable support frames shown partially open.

The cross-sectional view of FIG. 13 clearly shows the ledge 11 just below the inwardly extending flange 10 at one end of the mainframe 3 and the ledge 37 just below the flange 9 of the vertically extending partition 6 dividing the first and second chambers 7 and 8, respectively. The first adjustable support frame 12 and the second adjustable support frame 36 are each shown secured in an open position by respective rotatable and fixed brackets and wing-nuts.

Figure 14:
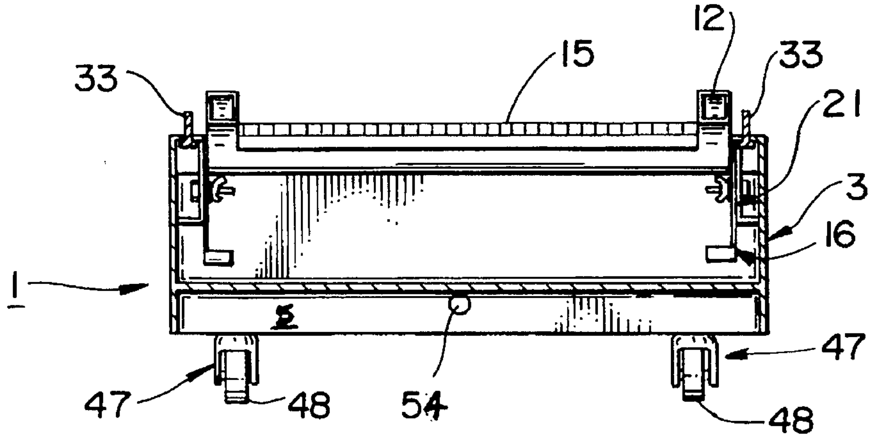
FIG. 14 is a cross-sectional view of the utility jack shown in FIG. 9 taken through lines 14,14.

The cross-sectional view of FIG. 14 shows further details of the movable brackets 16,16, L-shaped, fixed brackets 21,21, threaded bolts 25,25 and wing-nuts 27,27 when the first adjustable support frame 12 is in an open position.

If the utility jack is to be used only for an inclined roof, then caster wheels would not be required and, therefore, the caster wheel assemblies 47 and brackets 49 could be eliminated from the structure shown in FIG. 2.

While the utility jack of this invention is particularly usefull for roofing work it is also adaptable for use as a tool box and/or tool support for an automotive mechanic in the embodiment where the caster wheels are used in lieu of the foam rubber element.

While the invention has been particularly shown and described with reference to preferred embodiments thereof, it will be understood by those skilled in the art that various changes and modifications in form and detail may be made thereof without departing from the spirit and scope of the invention.

What is claimed is:

1. A utility jack for an inclined roof comprising a substantially rectangular mainframe having upstanding walls and a lateral partition therewithin so as to form two major cavities therein, an upper cavity and a lower cavity, a vertical partition within said upper cavity subdividing said upper cavity into two chambers, a first chamber and a second chamber, said first chamber being larger than said second chamber, at least one adjustable support frame movably attached to said mainframe and having a first reversible tray associated therewith, said at least one adjustable support frame extending within the upper part of said first chamber, a second reversible tray being associated with said second chamber, at least one pair of fixed brackets wherein each fixed bracket has a fixed guiding means attached thereto, one pair of rotatably movable brackets wherein each movable bracket has an elongated aperture therein, each of said one pair of rotatably movable brackets being attached to an opposite outer side of said at least one adjustable support frame, each of said one pair of fixed brackets being attached to an opposite sidewall of said mainframe within said first chamber such that it is adjacent a respective one of said one pair of rotatably movable brackets and such that a respective one of said fixed guiding means passes through the elongated aperture of a respective one of said at least one pair of rotatably movable brackets, one pair of fastening means for securing said at least one adjustable support frame to said fixed guiding means such that said at least one adjustable support frame is in an open position and provides a level support for said first reversible tray, and a large area, non-skid, elastomeric element being positioned within said lower cavity such that a portion thereof extends externally of said lower cavity of said mainframe.

2. A utility jack as set forth in claim 1 wherein said fixed guiding means are threaded bolts and said at least one pair of fastening means are wing-nuts.

3. A utility jack as set forth in claim 1 wherein said upper cavity is less shallow than said lower cavity.

4. A utility jack as set forth in claim 1 wherein said mainframe has an inwardly extending flange along the upper periphery of said upper cavity.

5. A utility jack as set forth in claim 4 wherein said first reversible tray is rectangular and has an outwardly extending flange around its upper periphery with each of the longer opposing portions of said flange having an aperture therein at approximately mid-way thereof.

6. A utility jack as set forth in claim 5 wherein said mainframe has a vertically extending post on opposite sides of said inwardly extending flange adjacent said first chamber, each vertically extending post corresponding in position to a respective aperture in said outwardly extending flange of said first reversible tray.

7. A utility jack as set forth in claim 6 wherein another pair of fastening means are provided for securing said first reversible tray to said vertically extending posts of said mainframe in either one of two orientations for said first reversible tray.

8. A utility jack as set forth in claim 7 wherein said vertically extending posts are threaded bolts.

9. A utility jack as set forth in claim 8 wherein said another pair of fastening means are wing-nuts.

10. A utility jack as set forth in claim 1 wherein said mainframe has a handle on an external, elongated side thereof.

11. A utility jack as set forth in claim 1 wherein said utility jack further comprises at least one hinge attached to one side of said at least one adjustable support frame and to an inner sidewall of said mainframe within said first chamber.

12. A utility jack as set forth in claim 11 wherein said at least one hinge is an elongated butt hinge or piano hinge.

13. A utility jack as set forth in claim 11 wherein said inner sidewall of said mainframe within said first chamber has an elongated ledge along an upper end portion of said inner sidewall and said at least one hinge is attached to said elongated ledge.

14. A utility jack as set forth in claim 1 wherein said mainframe, partitions, trays, and said at least one adjustable support frame are made from metal or plastic.

15. A utility jack as set forth in claim 14 wherein said mainframe, partitions, trays, and said at least one adjustable support frame are made from galvanized sheet metal with a baked on enamel or powdered coating.

16. A utility jack as set forth in claim 1 wherein each of said one pair of rotatably movable brackets is attached to said at least one adjustable support frame by means of a rivet such that it is rotatably movable with respect thereto.

17. A utility jack as set forth in claim 1 wherein the area of said elastomeric element is slightly larger than the area of said lower cavity.

18. A utility jack as set forth in claim 1 wherein the inner sidewalls of said mainframe defining said lower cavity have non-skid surfaces to insure retention of said elastomeric element within said lower cavity.

19. A utility jack as set forth in claim 18 wherein said non-skid surfaces are provided by means of an epoxy paint including a sand additive on said inner sidewalls.

20. A utility jack as set forth in claim 1 wherein said utility jack further comprises an L-shaped safety hook which is movably attached to an an outside end wall of said mainframe.

21. A utility jack as set forth in claim 20 wherein said safety hook is attached to said outside end wall by means of a threaded bolt and a wing-nut.

22. A utility jack as set forth in claim 21 wherein said smaller leg of said safety hook has at least one aperture therein and is parallely adjacent or in contact with said inclined roof when said safety hook is in operational position.

23. A utility jack as set forth in claim 1 wherein said jack further comprises another adjustable support frame movably attached to said mainframe and said second reversible tray being associated therewith, said another adjustable support frame extending within the upper part of said second chamber, another pair of fixed brackets wherein each fixed bracket has another fixed guiding means attached thereto, another pair of rotatably movable brackets wherein each movable bracket has an elongated aperture therein, each of said another pair of rotatably movable brackets being attached to an opposite outer side of said another adjustable support frame, each of said another pair of fixed brackets being attached to an opposite sidewall of said mainframe within said second chamber such that it is adjacent a respective one of said another pair of rotatably movable brackets and such that a respective one of said another fixed guiding means passes through the elongated aperture of a respected one of said another pair of rotatably movable brackets, and a further pair of fastening means for securing said another adjustable support frame to said another fixed guiding means such that said another adjustable support frame is in an open position and provides a level support for said second reversible tray.

24. A utility jack as set forth in claim 23 wherein said another fixed guiding means are threaded bolts and said further pair of fastening means are wing-nuts.

25. A utility jack as set forth in claim 23 wherein said mainframe, partitions, trays, said at least one adjustable support frame and said another adjustable support frame are made from metal or plastic.

26. A utility jack as set forth in claim 25 wherein said mainframe, partitions, trays, said at least one adjustable support frame and said another adjustable support frame are made from galvanized sheet metal with a baked on enamel or powdered coating.

27. A utility jack as set forth in claim 23 wherein said another adjustable support frame has at least one hinge attached to one side thereof and to an inner sidewall of said mainframe within said second chamber.

28. A utility jack as set forth in claim 27 wherein said at least one hinge is an elongated butt hinge or piano hinge.

29. A utility jack as set forth in claim 27 wherein said vertical partition has an elongated ledge along an upper end portion thereof and within said second chamber, said at least one hinge being attached to said elongated ledge.

30. A utility jack as set forth in claim 23 wherein each of said another pair of rotatably movable brackets is attached to said another adjustable support frame by means of a rivet such that it is rotatably movable with respect thereto.

31. A utility jack comprising a substantially rectangular mainframe having upstanding walls and a lateral partition therewithin so as to form two major cavities therein, an upper cavity and a lower cavity, a vertical partition within said upper cavity subdividing said upper cavity into two chambers, a first chamber and a second chamber, said first chamber being larger than said second chamber, at least one adjustable support frame movably attached to said mainframe and having a first reversible tray associated therewith, said at least one adjustable support frame extending within the upper part of said first chamber, a second reversible tray being associated with said second chamber, at least one pair of fixed brackets wherein each fixed bracket has a fixed guiding means attached thereto, one pair of rotatably movable brackets wherein each movable bracket has an elongated aperture therein, each of said one pair of rotatably movable brackets being attached to an opposite outer side of said at least one adjustable support frame, each of said one pair of fixed brackets being attached to an opposite sidewall of said mainframe within said first chamber such that it is adjacent a respective one of said one pair of rotatably movable brackets and such that a respective one of said fixed guiding means passes through the elongated aperture of a respective one of said at least one pair of rotatably movable brackets, one pair of fastening means for securing said at least one adjustable support frame to a respective one of said fixed guiding means such that said at least one adjustable support frame is in an open position and provides a level support for said first reversible tray, and four caster wheel assemblies, each one of said assemblies having a caster wheel and each one of said assemblies being attached to said rectangular mainframe adjacent a respective corner of said mainframe.

32. A utility jack as set forth in claim 31 wherein said fixed guiding means are threaded bolts and said at least one pair of fastening means are wing-nuts.

33. A utility jack as set forth in claim 31 wherein said upper cavity is less shallow than said lower cavity.

34. A utility jack as set forth in clam 31 wherein said mainframe has an inwardly extending flange along the upper periphery of said upper cavity.

35. A utility jack as set forth in claim 31 wherein said first reversible tray is rectangular and has an outwardly extending flange around its upper periphery with the longer opposing portions of said flange having an aperture therein at approximately mid-way thereof.

36. A utility jack as set forth in claim 35 wherein said mainframe has a vertically extending post on opposite sides of said inwardly extending flange adjacent said first chamber, each vertically extending post corresponding in position to a respective aperture in said outwardly extending flange of said first reversible tray.

37. A utility jack as set forth in claim 36 wherein another pair of fastening means are provided for securing said first reversible tray to said vertically extending posts of said mainframe in either one of two orientations for said first reversible tray.

38. A utility jack as set forth in claim 37 wherein said vertically extending posts are threaded bolts.

39. A utility jack as set forth in claim 38 wherein said another pair of fastening means are wing-nuts.

40. A utility jack as set forth in claim 31 wherein said mainframe has a handle on an external, elongated side thereof.

41. A utility jack as set forth in claim 31 wherein said at least one adjustable support frame has at least one hinge attached to one side thereof and to an inner sidewall of said mainframe within said first chamber.

42. A utility jack as set forth in claim 41 wherein said at least one hinge is an elongated butt hinge or piano hinge.

43. A utility jack as set forth in claim 41 wherein said inner sidewall of said mainframe within said first chamber has an elongated ledge along an upper end portion of said inner sidewall and said at least one hinge is attached to said elongated ledge.

44. A utility jack as set forth in claim 31 wherein said second reversible tray is rectangular and has an outwardly extending flange around its upper periphery with the longer opposing portions of said flange having an aperture therein at approximately mid-way thereof.

45. A utility jack as set forth in claim 44 wherein said mainframe has an inwardly extending flange along the upper periphery of said upper cavity and has a vertically extending post on opposite sides of said inwardly extending flange adjacent said second chamber, each of said vertically extending posts corresponding in position to a respective aperture in said outwardly extending flange of said second reversible tray.

46. A utility jack as set forth in claim 45 wherein another pair of fastening means are provided for securing said second reversible tray to said vertically extending posts of said inwardly extending flange adjacent said second chamber in either one of two orientations of said second reversible tray.

47. A utility jack as set forth in claim 46 wherein said vertically extending posts of said inwardly extending flange adjacent said second chamber are threaded bolts.

48. A utility jack as set forth in claim 47 wherein said another pair of fastening means are wing-nuts.

49. A utility jack as set forth in claim 31 wherein said mainframe, partitions, trays, and said at least one adjustable support frame are made from metal or plastic.

50. A utility jack as set forth in claim 49 wherein said mainframe, partitions, trays, and said at least one adjustable support frame are made from galvanized sheet metal with a baked on enamel or powdered coating.

51. A utility jack as set forth in claim 31 wherein each of said one pair of rotatably movable brackets is attached to said opposite outer side of said at least one adjustable support frame within said first chamber by means of a rivet such that it is rotatably movable with respect thereto.

52. A utility jack as set forth in claim 31 wherein said utility jack further comprises a large area, non-skid, elastomeric element positioned within said lower cavity such that a portion thereof extends externally of said lower cavity of said mainframe and wherein said caster wheels do not extend beyond said portion of said elastomeric element.

53. A utility jack as set forth in claim 52 wherein said elastomeric element is made from foam rubber.

54. A utility jack as set forth in claim 52 wherein the area of said elastomeric element is slightly larger than the area of said lower cavity.

55. A utility jack as set forth in claim 52 wherein the inner sidewalls of said mainframe defining said lower cavity have non-skid surfaces to insure retention of said elastomeric element within said lower cavity.

56. A utility jack as set forth in claim 55 wherein said non-skid surfaces are provided by means of an epoxy paint including a sand additive on said inner sidewalls.

57. A utility jack as set forth in claim 52 wherein said utility jack further comprises an L-shaped safety hook which is movably attached to an outside end wall of said mainframe.

58. A utility jack as set forth in claim 57 wherein said safety hook is attached to said outside end wall by means of a threaded bolt and a wing-nut.

59. A utility jack as set forth in claim 58 wherein said smaller leg of said safety hook has at least one aperture therein and is parallely adjacent or in contact with an inclined roof when said safety hook is in operational position.

60. A utility jack as set forth in claim 31 wherein said vertical partition has an elongated ledge along an upper portion thereof and within said second chamber.

61. A utility jack as set forth in claim 31 wherein said jack further comprises another adjustable support frame movably attached to said mainframe and said second reversible tray being associated therewith, said another adjustable support frame extending within the upper part of said second chamber, another pair of fixed brackets wherein each fixed bracket has another fixed guiding means attached thereto, another pair of rotatably movable brackets wherein each movable bracket has an elongated aperture therein, each of said another pair of rotatably movable brackets being attached to an opposite outer side of said of said another adjustable support frame, each of said another pair of fixed brackets being attached to an opposite sidewall of said mainframe within said second chamber such that it is adjacent a respective one of said another pair of rotatably movable brackets and such that a respective one of said another fixed guiding means passes through the elongated aperture of a respected one of said another pair of rotatably movable brackets, and a further pair of fastening means for securing said another adjustable support frame to said another fixed guiding means such that said another adjustable support frame is in an open position and provides a level support for said second reversible tray.

62. A utility jack as set forth in claim 61 wherein said another fixed guiding means are threaded bolts and said further pair of fastening means are wing-nuts.

63. A utility jack as set forth in claim 61 wherein said mainframe, partitions, trays, said at least one adjustable support frame and said another adjustable support frame are made from metal or plastic.

64. A utility jack as set forth in claim 63 wherein said mainframe, partitions, trays, said at least one adjustable support frame and said another adjustable support frame are made from galvanized sheet metal with a baked on enamel or powdered coating.

65. A utility jack as set forth in claim 61 wherein said another adjustable support frame has at least one hinge attached to one side thereof and to said vertical partition within said second chamber.

66. A utility jack as set forth in claim 65 wherein said at least one hinge is an elongated butt hinge or piano hinge.

67. A utility jack as set forth in claim 65 wherein said vertical partition has an elongated ledge along an upper end portion thereof and within said second chamber, said at least one hinge being attached to said elongated ledge.

68. A utility jack as set forth in claim 61 wherein each of said another pair of rotatably movable brackets is attached to said another adjustable support frame by means of a rivet such that it is rotatably movable with respect thereto.

* * * * *